UNITED STATES PATENT OFFICE 2,468,180

PROCESS FOR BREAKING PETROLEUM EMULSIONS

Melvin De Groote, University City, and Bernhard Keiser, Webster Groves, Mo., assignors to Petrolite Corporation, Ltd., Wilmington, Del., a corporation of Delaware No Drawing. Application March 11, 1948, Serial No. 14,395

9 Claims. (Cl. 252—341)

This invention relates to processes or procedures for preventing, breaking, or resolving emulsions of the water-in-oil type, and has for its main object to provide a novel process for resolving petroleum emulsions of the water-in-oil type, that are commonly referred to as "cut oil," "roily oil," "emulsified oil," etc., and which comprise fine droplets of naturally-occurring waters or brines dispersed in a more or less permanent state throughout the oil which constitutes the continuous phase of the emulsion.

Another object of our invention is to provide an economical and rapid process for separating emulsions which have been prepared under controlled conditions from mineral oil, such as crude oil and relatively soft waters or weak brines. Controlled emulsification and subsequent demulsification, under the conditions just mentioned, are of significant value in removing impurities, particularly inorganic salts from pipeline oil.

Demulsification, as contemplated in the present application, includes the preventive step of commingling the demulsifier with the aqueous component which would or might subsequently become either phase of the emulsion, in absence of such precautionary measure. Similarly, such demulsifier may be mixed with the hydrocarbon component.

The material, compound, product, or composition of matter that is used as the demulsifying agent of our process consists of a cation-active polychloride containing an imidazoline ring.

Such cation-active polychloride is obtained by reaction between (A) An oxyalkylated imidazoline substituted in the 2-position by a radical containing from 11–22 carbon atoms selected from the group consisting of alicyclic hydrocarbon radicals, aliphatic hydrocarbon radicals substituted by hydroxyl radicals; said oxyalkylated imidazolines containing a member of the class consisting of

and

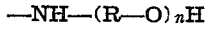

radicals, wherein R denotes an alkylene radical having at least 2 and not more than 4 carbon atoms, and $n$ is the numeral 1 to 10; and (B) Diglycol chloroformate, sometimes referred to as diethylene glycol bis(chloroformate), the formula for such compound being as follows:

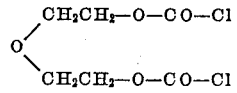

A simple example of an oxyalkylated imidazoline is 1-hydroxyethyl-2-heptadecenyl glyoxalidine, the formula of which is as follows:

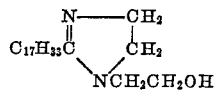

The reaction involving two moles of such glyoxalidine and one mole of diglycol chloroformate proceeds in the following manner:

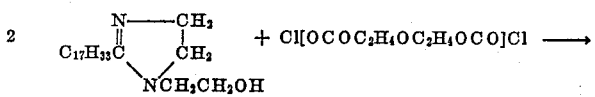

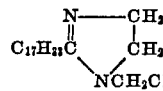 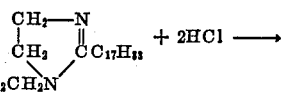

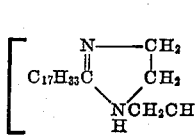 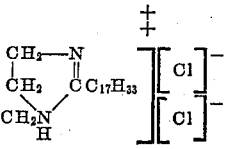

A consideration of the reaction, or reactions which take place between these two classes of reagents, indicates that a varied and more complex class of materials is obtainable than the rather simple example noted in the formula immediately preceding. However, it may be well to include specific examples before considering the more elaborate derivatives. For convenience, the imidazolines, or oxyalkylated imidazolines as the case may be, are referred to as an amine reactant.

Diglycol chloroformate is a colorless, relatively non-volatile organic liquid. It has a comparatively high boiling point, and thus, lends itself to reaction by merely combining the chloroformate with a suitable oxyalkylated imidazoline under a reflux condenser equipped with a suitable stirrer.

Oxyalkylated imidazolines have been described in the literature, as, for example, in our U. S. Patent No. 2,369,818, dated February 20, 1945. What is said hereinafter is substantially as it appears in verbatim form in the aforementioned patent, with certain obvious reduction in scope.

Thus, the specific imidazolines herein contemplated as reactants, are oxyalkylated imidazolines substituted in 2-position, by a radical containing from 11-22 carbon atoms selected from the group consisting of alicyclic hydrocarbon radicals, aliphatic hydrogen radicals, and aliphatic hydrocarbon radicals substituted by hydroxyl radicals; said oxyalkylated imidazolines containing a member of the class consisting of:

and

radicals, wherein R denotes an alkylene radical having at least 2 and not more than 4 carbon atoms, and $n$ is a whole number but not over 10, and preferably less than 5.

The intermediate products herein contemplated for reaction with diglycol chloroformate, are characterized by having a five-membered heterocyclic ring with two atoms different from carbon. More specifically, they may be considered as derivatives of imidazole, frequently referred to as glyoxaline, imidazole (glyoxaline) is indicated by the following formula:

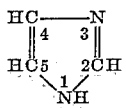

The imidazolines or glyoxalidines may be considered as dihydroderivatives of imidazole (glyoxaline); and thus the expressions "dihydroglyoxalines" and "glyoxalidines" are often employed. The introduction of two hydrogen atoms at the 4-5 position results in the conversion of imidazole into dihydroglyoxaline, which may be indicated by the following formula:

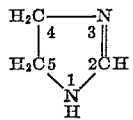

As to the manufacture of imidazolines, reference is made to the following patents: U. S. Patents Nos. 2,215,861, 2,215,862, 2,215,863 and 2,215,864, dated September 24, 1940, to Waldmann and Chwala.

Imidazolines or glyoxalidines may be regarded as dehydration products of certain amides, and they may be obtained by reacting polyamines and the higher carboxylic acids under certain conditions. The formation of these glyoxalidines compounds, while forming no part of the present invention, is indicated by the following scheme:

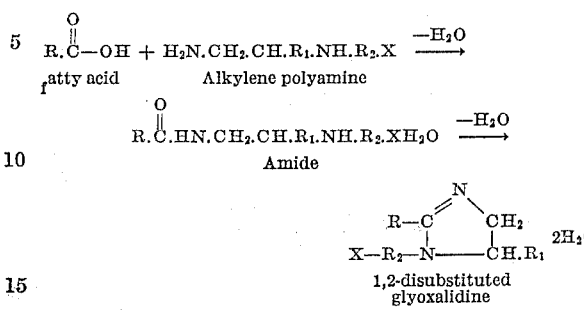

wherein R represents an alkyl or alkenyl group containing from 10 to 20 carbon atoms (the residue of a higher fatty acid; $R_1$ represents an alkylene group, or a lower alkyl substituted alkylene group; and X represents a hydroxyl group, an amino group, or an amino-alkylene substituted amino group. See U. S. Patent No. 2,214,152, dated September 10, 1940, to Wilkes. See also U.S. Patents Nos. 2,155,877 and 2,155,878, both dated April 25, 1939, to Waldmann and Chwala.

The expression "higher molecular weight carboxy acids" is an expression frequently employed to refer to certain organic acids, particularly monocarboxy acids, having more than 6 carbon atoms, and generally, less than 40 carbon atoms. The commonest examples include the detergent-forming acids, i. e., those acids which combine with alkalies to produce soap or soap-like bodies. The detergent-forming acids, in turn, include naturally-occurring fatty acids, resin acids, such as abietic acid, naturally-occurring petroleum acids such as naphthenic acids, and carboxy acids produced by the oxidation of petroleum. As will be subsequently indicated, there are other acids which have somewhat similar characteristics and are derived from somewhat different sources, and are different in structure, but can be included in the broad generic term previously indicated.

Among sources of such acids may be mentioned straight chain and branched chain, saturated and unsaturated, carboxylic, aliphatic, alicyclic, fatty, aromatic, hydroaromatic, and aralkyl acids including caprylic acid, butyric acid, heptylic acid, caproic acid, capric acid, pimelic acid, sebacic acid, erucic acid, saturated and unsaturated higher molecular weight aliphatic acids, such as the higher fatty acids containing at least eight carbon atoms, and including, in addition to those mentioned, melissic acid, stearic acid, oleic acid, ricinoleic acid, diricinoleic acid, triricinoleic acid, polyricinoleic acid, ricinostearolic acid, ricinoleyl lactic acid, acetylricinoleic acid, linoleic acid, linolenic acid, lauric acid, myristic acid, undecylenic acid, palmitic acid, mixtures of any two or more of the above-mentioned acids or other acids, mixed higher fatty acids derived from animal or vegetable sources, for example, lard, cocoanut oil, rapeseed oil, sesame oil, palm kernel oil, palm oil, olive oil, corn oil, cottonseed oil, sardine oil, tallow, soyabean oil, peanut oil, castor oil, seal oils, whale oil, shark oil and other fish oils, teaseed oil, partially or completely hydrogenated animal and vegetable oils, such as these mentioned; hydroxy and alpha-hydroxy higher carboxylic, aliphatic and fatty acids, such as hydroxystearic acid, dihydroxypalmitic acid, dihydroxystearic acid, dihydroxybehenic acid, alphahydroxy capric acid, alphahydroxy stearic acid, alphahydroxy palmitic acid, alphahydroxy lauric acid, alphahydroxy myristic acid, alphahydroxy cocoanut oil mixed fatty acids, alphahydroxy margaric acid, alphahydroxy arachidic acid, and the like; fatty and similar acids derived from various waxes, such as beeswax, spermaceti, montan wax, Japan wax, coccerin, and carnauba wax. Such acids include carnaubic acid, cerotic acid, montanic acid, psyllastearic acid, etc. As suggested, one may also employ higher molecular weight carboxylic acids derived, by oxidation and other methods, from paraffin wax, petroleum and similar hydrocarbons; resinic and hydroaromatic acids, such as hexahydrobenzoic acid, hydrogenated naphthoic, hydrogenated carboxydiphenyl, naphthenic, and abietic acid; aralkyl and aromatic acids, such as hexahydrobenzoic acid, hydrogenated naphthoic, hydrogenated poly-carboxy-diphenyl, hydrogenated naphthenic, and hydrogenated abietic acid; aralkyl and aromatic acids, such as benzoic acid, Twitchell fatty acids, naphthoic acid, hydroxybenzoic acid, and the like.

Other suitable acids include phenylstearic acid, benzoylnonylic acid, campholic acid, fencholic acid, cetyloxybutyric acid, cetyloxyacetic acid, etc.

Another source of suitable acids are those commonly referred to as lac acids, such, for example, as the acids derived from shellac. Such acids include various polyhydroxy acids, for example, aleuritic acid, shelloic acid, and kerrolic acid.

As is well known, one may use substituted acids in which some other non-functional constituent enters the structure of the fatty acid. For instance, one may use aryl-, hydroxy-, alkoxy-, chloro-, keto-, and amino-derivatives. Generally speaking, however, it is always preferable to use the unsubstituted acid, particularly free from substituents which contain either oxygen or nitrogen atoms. Generally speaking, the introduction of hydrocarbon radicals, regardless of source, has little effect, except in altering the hydrophile-hydrophobe balance.

One may also employ the blown or oxidized acids, such as blown ricinoleic acid, blown oleic, etc., or estolides derived from blown oils, such as blown castor oil, blown soyabean oil, etc.

Needless to say, the acids themselves need not be employed; but one may readily employ any functional equivalent, such as the anhydrides, the acyl chloride, or the like. In some instances, the esters, especially in presence of a trace or a significant amount of water, act as the acid itself, in that the acid is liberated. Unless specific reference is made to a particular isomer, one may employ any isomer or mixture of various isomers, if the acid or acids are so available. We have produced demulsifiers for use in our process by the following procedures:

HYDROXYLATED INTERMEDIATE

*Example 1*

1-aminoethyl-2-heptadecenyl glyoxalidine was prepared by mixing one gram mole (282 grams) of oleic acid with two gram moles (206 grams) of diethylene triamine, and heating the mixture for a period of about 16 hours under a distilling column. Water was continuously removed until a temperature of about 245° C. was reached. The quantity of water thus removed amounted to about 1.7 moles. Unreacted diethylene triamine was distilled from the reaction mixture under vacuum, and the residue then was purified by distillation at an absolute pressure of 1 mm. of mercury, at which point it boiled within a temperature range of 225° to 250° C. About 220 grams of the 1-aminoethyl-2-heptadecenyl glyoxalidine was obtained as a pale yellow liquid. The product also may be designated, by reference to the reactants used in its preparation, as oleyl diethylene triamine.

Prior reaction may be indicated in the following manner:

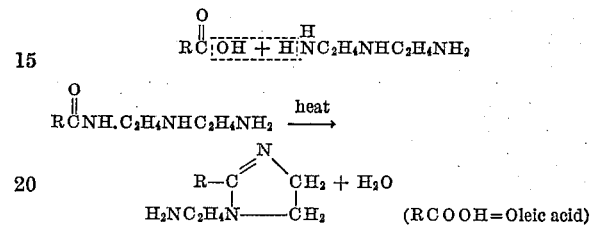

(RCOOH = Oleic acid)

Ethylene oxide was introduced into the above basic compounds on the basis of two gram moles of ethylene oxide for one gram mole of the base. This required 88 grams of ethylene oxide for 349 grams of the base. As is well known, ethylene oxide adds readily to basic compounds having reactive hydrogen atoms. In fact, the addition is so rapid that no catalyst need to be added. This is true in respect to all the basic imidazolines herein described. The time required to introduce 2 moles of ethylene oxide per mole of the base, using a temperature of 70° C., and an initial pressure of 60 pounds per square inch, was one-half hour to 1½ hour. At the end of the reaction the pressure dropped to 0 pounds.

The oxyethylated derivative of the previously described compound may be indicated by the following formula:

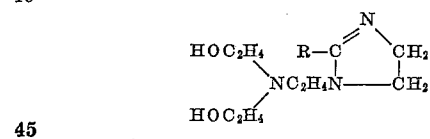

A further example or variant is exemplified by exactly the same procedure as before, except using 4 moles of ethylene oxide, instead of 2 moles per mole of base. The same comparable compound is obtained, with the exception that an ether linkage appears as indicated in the following formula:

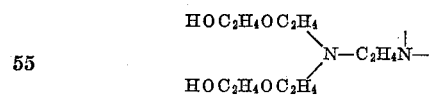

If 2 moles of ethylene oxide were first employed, followed by 2 moles of glycide per mole of base, and assuming uniform distribution, the resultant product would have 4 hydroxyls, as indicated by the following formula:

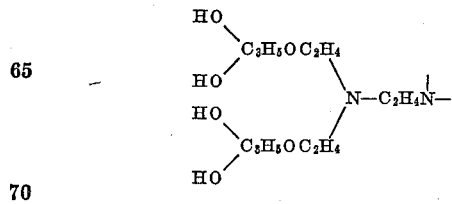

In subsequent examples concerned with hydroxylated intermediates specifically, in Examples 2 to 7 appearing immediately hereafter, reference of the same procedure as in Example 1 is specifically to the first oxyethylating procedure, as noted in Example 1, to wit, the introduction of 2 moles of ethylene oxide per mole of amine base.

HYDROXYLATED INTERMEDIATE

Example 2

The base used in the preceding example was replaced by 1-(aminoethyl ethylamino)-2-heptadecenyl glyoxalidine. This glyoxalidine was prepared by reacting 1 gram mole of oleic acid with three gram moles (438 grams) of triethylene tetramine in a vessel equipped with a distilling column. The mixture was heated for a period of about 6 hours, and water was continuously removed until a temperature of about 300° C. was reached. Approximately 1.9 moles of water were thus removed. The reaction mixture was then distilled under vacuum to remove excess triethylene tetramine.

It is to be noted that this compound contained the following linkage:

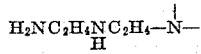

The radical above depicted contains 3 amino hydrogen atoms. Thus, when the product is treated, for example, with 2 moles of ethylene oxide, only 2 of the 3 amino hydrogen atoms are converted into the corresponding ethanol radicals. When subsequent reaction takes place between 2 moles of the glyoxalidine and one mole of diglycol chloroformate, it appears impossible to determine whether the reaction has involved the residual amino hydrogen atoms or the alcoholic atoms, or if a mixture is formed. As far as the final product is concerned, it is absolutely immaterial. When 3 or more moles of alkylene oxide, such as ethylene oxide are employed, all 3 amino hydrogen atoms are converted into an alkanol radical, and thus amides cannot be formed. The resultant of the above reaction involving the acid and the tetramine was a yield of approximately 390 gms. of the imidazoline. This represented one gram mole. We divided this amount into two halves, each half representing, roughly, 190 grams. We treated one-half gram mole with one mole of ethylene oxide (mole ratio 1:2) and we treated the other half with 66 grams of ethylene oxide (mole ratio 1:3). The ethylene oxide was added under substantially the same time, temperature, and pressure conditions, as noted under Example 1, preceding. As stated before, ethylene oxide adds with extreme rapidity.

HYDROXYLATED INTERMEDIATE

Example 3

An imidazoline was obtained from oleic acid and tetraethylenepentamine by using equimolar amounts. No attempt was made to use an excess of the amine and to distil out the excess subsequently. This procedure does not give quite as satisfactory a yield as following the procedure described under Examples 1 and 2, preceding, for the manufacture of the imidazoline. However, it is perfectly satisfactory for use as an intermediate in the process described.

Approximately 435 grams of the imidazoline was obtained employing 190 grams of the polyamine and 282 grams of oleic acid. This was divided into thirds and 145 grams were employed in each of three separate oxyethylations. In the first oxyethylation the molal ratio employed was 1:2. Thirty grams of ethylene oxide was added to 145 grams of the imidazoline. In the second procedure, the molal ratio employed was 3:1. Forty-four grams of ethylene oxide was added to 145 grams of the imidazoline. In the third procedure a molal ratio of 4:1 was employed. In this instance, 60 grams of ethylene oxide was employed for 145 grams of the imidazoline. In each instance, the ethylene oxide was added under the same time, temperature, and pressure conditions noted under Example 1, preceding. As previously noted, ethylene oxide adds to this reactant with extreme rapidity.

In this instance the following radical appears in the glyoxalidine:

Thus, in this case as much as 3 moles of ethylene oxide or other suitable alkylene oxide could be employed and still leave an amino group susceptible to reaction. See what is said previously in regard to the prepared variants. This compound, as described, and the previous one involving the use of glycide, illustrates the fact that one mole of a suitably selected glyoxalidine can react with a mole of diglycol chloroformate. It is advantageous, however, to use the reactants in the ratio of 2 moles of the glyoxalidine and one mole of the chloroformate.

The use of tetraethylenepentamine also illustrates another fact, as is well known, to wit: that one mole of such a compound, the pentamine, for example, can be reacted with 2 moles of oleic acid or other selected reactant, to introduce 2 glyoxalidine rings, one being at each terminal. The formula for such a compound is obvious and does not require further elaboration.

HYDROXYLATED INTERMEDIATE

Example 4

Lauric acid is substituted as a reactant for oleic acid in the three preceding examples.

HYDROXYLATED INTERMEDIATE

Example 5

Ricinoleic acid is substituted for oleic acid in Examples 1 to 3, preceding.

HYDROXYLATED INTERMEDIATE

Example 6

Naphthenic acid derived from Gulf Coast crude, and having a molecular weight of approximately 220, is substituted for oleic acid in Examples 1 to 3, preceding.

HYDROXYLATED INTERMEDIATE

Example 7

An equivalent molal amount of propylene oxide is substituted for ethylene oxide in Examples 1 to 6, preceding.

The preferred type of demulsifier is obtained by the action of 1 to 5 moles of the oxyalkylating agent, for instance, ethylene oxide or propylene oxide, on one mole of the imidazoline.

Where the hereto appended claims specify the presence of a member of the class consisting of

and

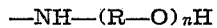

radicals, i. e., the group introduced by oxyalkylation at the amino hydrogen position, it is understood that R includes groups derived from ethylene oxide, propylene oxide, butylene oxide, glycide and methylglycide. As stated, $n$ represents the numerals 1 to 10, and preferably, not over 4.

Actually, a somewhat different variation can be employed in the manufacture of the oxyalkylated imidazolines. For example, ethylenediamine, diethylenetriamine, triethylenetetramine and tetraethylenepentamine can be treated with a mole of ethyleneoxide or propyleneoxide or butyleneoxide, or glycide or methylglycide, so as to yield the corresponding derivative having a hydroxyalkyl attached to one terminal nitrogen and the structure at the other end remaining unchanged. Such compound can be reacted in the usual manner with an acid, such as oleic acid, stearic acid, or the like, to produce the oxyalkylated imidazoline.

Another procedure which avoids this particular step is to simply purchase the hydroxyalkylated material in the open market. Thus, one may obtain the hydroxyethyl, hydroxypropyl, hydroxybutyl, or other equivalent ethylenediamine. 2-aminoethylethanolamine (hydroxyethyl ethylenediamine) is sold as a commercial product and can be reacted with a variety of the higher fatty acids previously noted.

If desired, one does not even have to go to this much trouble and can purchase 1-hydroxyethyl-2-heptadecenyl glyoxalidine. As previously stated, this particular compound has the following structure:

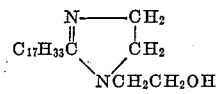

The corresponding heptadecyl compound has the following structure:

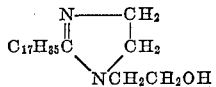

The corresponding ricinoleyl derivative has the following structure.

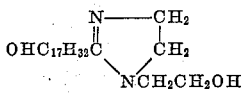

Thus, the simplest procedure for manufacturing the herein specified compounds is simply to purchase 1-hydroxyethyl-2-heptadecenyl glyoxalidine and react it in the proportion of 2 moles of such glyoxalidine with one mole of diglycol chloroformate. The following examples illustrate the manufacture of the compounds or products herein described and intended for use in various industrial arts, particularly for emulsification of petroleum emulsions.

CATIONIC POLYCHLORIDES

Example 1

2 gram moles (700 grams) of 1-hydroxyethyl-2-heptadecenyl glyoxalidine were mixed with 1 gram mole (231 grams) of diglycol chloroformate and heated under a reflux condenser for one hour at 160° to 180° C. On cooling, a wax-like solid resulted. It was very soluble in water and gave a solution which foamed vigorously on shaking. In this connection it is to be noted that both reactants, to wit, the amine and the chloroformate, are water-insoluble prior to reaction.

CATIONIC POLYCHLORIDES

Example 2

The same identical procedure was followed as in Example 1, preceding, except that the heptadecyl compound was substituted for the heptadecenyl compound. The time of reaction was a little bit longer, to wit, 1½ hours, and the temperature employed slightly higher, 170° to 185° C. The material obtained was more solid than in the previous example, but was soluble, particularly in warm water. As in said Example 1, the molar ratio represented two moles of the amino compound for each mole of the diglycol chloroformate.

CATIONIC POLYCHLORIDES

Example 3

The same procedure was followed as in Example 1, preceding, except that the ricinoleyl derivative was employed instead of the heptadecenyl derivative. The product showed approximately the same consistency as in Example 1, except with a tendency to be somewhat softer. No effort was made to determine whether or not the chloroformate had reacted to any extent at the ricinoleyl hydroxyl. As in Example 1, the molar ratio represented two moles of the amino compound for each mole of the diglycol chloroformate.

CATIONIC POLYCHLORIDES

Example 4

Exactly the same procedure, without variation, was followed as in Example 1, preceding, except that the oxyalkylated imidazoline obtained by reaction between 2 moles of ethylene oxide and one mole of 1-aminoethyl-2-heptadecenyl glyoxalidine was substituted for 1-hydroxyethyl-2-hepta-decenyl glyoxalidine. The dihydroxylated compound herein employed as a reactant was described previously herein. The appearance of the final product was about the same as in Example 1. As in Example 1, the molar ratio represented two moles of the amino compound for each mole of the diglycol chloroformate.

CATIONIC POLYCHLORIDES

Example 5

Exactly the same procedure, without variation, was followed as in Example 1, preceding, except that the oxyalkylated imidazoline, obtained by reaction between 2 moles of ethylene oxide and one mole of 1-(aminoethyl ethylamine)-2-heptadecenyl glyoxalidine, was substituted for 1-hydroxyethyl-2-heptadecenyl glyoxalidine. The dihydroxylated compound herein employed as a reactant has been described previously. The appearance of the final product was about the same as in Example 1. As in Example 1, the molar ratio represented two moles of the amino compound for each mole of the diglycol chloroformate.

CATIONIC POLYCHLORIDES

Example 6

The same procedure was followed as in Example 1, preceding, except that 1-hydroxyethyl-2-heptadecenyl glyoxalidine was replaced by the comparable derivative derived from oleic acid and tetraethylenepentamine, as described in the previous example under the heading "Hydroxylated Intermediate, Example 3," followed by reaction with 2 moles of ethylene oxide. The appearance of the final product was somewhat more liquid than in Example 1, and it was of a dark amber color. As in Example 1, the molar ratio represented two moles of an amino compound for each mole of the diglycol chloroformate.

Cationic Polychlorides

Example 7

The same procedure was followed as in Example 4, preceding, except that the amine employed was derived by reaction between 4 moles of ethylene oxide (instead of 2 moles of ethylene oxide) and one mole of 1-aminoethyl-2-heptadecenyl glyoxalidine. The composition of this amine was as follows:

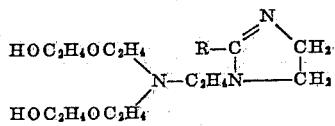

The appearance of this product and its solubility is the same as in Example 4, preceding, except that it showed somewhat greater solubility and was somewhat less solid than the product obtained in Example 1.

As previously pointed out, ethylene oxide in the previous examples can be replaced by any of the other alkylene oxides previously described having not over 4 carbon atoms, for instance, ethylene oxide, and can be replaced by an appropriate amount of another suitable alkylene oxide, such as propylene oxide, butylene oxide, glycide or methylglycide. Where the amine reactant contains a plurality of reactive hydrogen atoms, one mole of diglycol chloroformate can be reacted with one mole of the amine reactant. It is advantageous, however, to use 2 moles of the amine reactant for one mole of the diglycol chloroformate. In the various derivatives obtained in the manner described there may be combination between a divalent diglycol chloroformate radical and 2 oxygen atoms, or between 2 nitrogen atoms, or between an oxygen and a nitrogen atom, or in the event that the amine derivative is derived from ricinoleic acid, hydroxystearic acid, dihydroxystearic acid, or the like, it is possible, and in fact probable, that such alcoholic hydroxyl hydrogen atoms are similarly reactive and further variations are thus obtained. Previous reference has been made to the fact that tetraethylenepentamine may be reacted with 2 moles of a higher fatty acid, such as stearic acid, oleic acid, or the like, and the resultants subjected to oxyalkylation. Similarly, one might employ one mole of a high molal acid, such as oleic or stearic acid, and one mole of a low molal acid, such as acetic acid, hydroxyacetic acid, lactic acid, or the like. In light of what has been said, it is obvious that the formula can only be drawn so as to indicate the structure of the simpler derivatives herein described. A reaction product derived from pentaethylenehexamine and one or two moles of a higher fatty acid, such as oleic acid, can be united with 2 moles of diglycol chloroformate to yield a polychloride having 4 chloride ions. Reactions may also take place in which only one acyl chloride radical of the diglycol chloroformate reacts with the amine reactant. The more complex ones can only be described in terms of manufacture, i. e., as the product or resultant of the reaction between diglycol chloroformate and the specified amine reagents.

Conventional demulsifying agents employed in the treatment of oil field emulsions are used as such, or after dilution with any suitable solvent, such as water; petroleum hydrocarbons, such as gasoline, kerosene, stove oil; a coal tar product such as benzene, toluene, xylene, tar acid oil, cresol, anthracene oil, etc. Alcohols, particularly aliphatic alcohols, such as methyl alcohol, ethyl alcohol, denatured alcohol, propyl alcohol, butyl alcohol, hexyl alcohol, octyl alcohol, etc., may be employed as diluents. Miscellaneous solvents, such as pine oil, carbon tetrachloride, sulfur dioxide extract obtained in the refining of petroleum, etc., may be employed as diluents. Similarly, the material or materials employed as the demulsifying agent of our process for resolving emulsions, may be admixed with one or more of the solvents customarily used in connection with conventional demulsifying agents. Moreover, said material or materials may be used alone, or in admixture with other suitable well known classes of demulsifying agents.

It is well known that conventional demulsifying agents may be used in a water-soluble form, or in an oil-soluble form, or in a form exhibiting both oil and water-solubility. Sometimes they may be used in a form which exhibits relatively limited oil solubility. However, since such reagents are sometimes used in a ratio of 1 to 10,000, or 1 to 20,000, or even 1 to 30,000, or even 1 to 40,000, or 1 to 50,000 in desalting practice, such an apparent insolubility in oil and water is not significant, because said reagents undoubtedly have solubility within the concentration employed. This same fact is true in regard to the material or materials employed as the demulsifying agent of our process.

We desire to point out that the superiority of the reagent or demulsifying agent contemplated in our process, is based upon its ability to treat certain emulsions more advantageously and at a somewhat lower cost than is possible with other available demulsifiers, or conventional mixtures thereof. It is believed that the particular demulsifying agent or treating agent herein described will find comparatively limited application, so far as the majority of oil field emulsions are concerned; but we have found that such a demulsifying agent has commercial value, as it will economically break or resolve oil field emulsions in a number of cases which cannot be treated as easily or at so low a cost with the demulsifying agents heretofore available.

In practising our process for resolving petroleum emulsions of the water-in-oil type, a treating agent or demulsifying agent of the kind above described is brought into contact with or caused to act upon the emulsion to be treated, in any of the various apparatus now generally used to resolve or break petroleum emulsions with a chemical reagent, the above procedure being used either alone or in combination with other demulsifying procedure, such as the electrical dehydration process.

The demulsifier herein contemplated may be employed in connection with what is commonly known as down-the-hole procedure, i. e., bringing the demulsifier in contact with the fluids of the well at the bottom of the well, or at some point prior to the emergence of said fluids. This particular type of application is decidedly feasible when the demulsifier is used in connection with acidification of calcareous oil-bearing strata, especially if suspended in or dissolved in the acid employed for acidification.

A somewhat analogous use of our demulsifying agent is the removal of a residual mud sheath which remains after drilling a well by the rotary method. Sometimes the drilling mud contains added calcium carbonate, or the like, to render the mud susceptible to reaction with hydrochloric acid, or the like, and thus expedite its removal.

See U. S. Patent No. 2,135,909, dated Nov. 8, 1938, to Louis T. Monson.

Having thus described our invention, what we claim as new and desire to secure by Letters Patent is:

1. A process for breaking petroleum emulsions of the water-in-oil type, characterized by subjecting the emulsion to the action of a demulsifier including a cation-active polychloride; said cation-active polychloride being the reaction product of diglycol chloroformate and an oxyalkylated imidazoline substituted in the 2-position by a radical containing 11 to 22 carbon atoms selected from the group consisting of alicyclic hydrocarbon radicals, aliphatic hydrogen radicals, and aliphatic hydrocarbon radicals substituted by hydroxyl radicals; said oxyalkylated imidazolines containing a member of the class consisting of

and

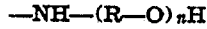

radicals, wherein R denotes an alkylene radical having at least 2 and not more than 4 carbon atoms, and $n$ is a numeral not over 10.

2. The process of claim 1, wherein the amine reactant contains one imidazoline ring structure only.

3. The process of claim 1, wherein the amine reactant contains one imidazoline ring structure only, and the radical substituted in the 2-position is an aliphatic radical derived from a higher fatty acid.

4. The process of claim 1, wherein the amine reactant contains one imidazoline ring structure only, and the radical substituted in the 2-position is an aliphatic radical derived from an unsaturated higher fatty acid.

5. The process of claim 1, wherein the amine reactant contains one imidazoline ring structure only, the radical substituted in the 2-position is an aliphatic radical derived from an unsaturated higher fatty acid, and R is an ethylene radical.

6. The process of claim 1, wherein the amine reactant contains one imidazoline ring structure only, the radical substituted in the 2-position is an aliphatic radical derived from an unsaturated higher fatty acid, R is an ethylene radical, with the proviso that the ratio of amine reactant to diglycol chloroformate is 2:1.

7. The process of claim 1, wherein the compound is

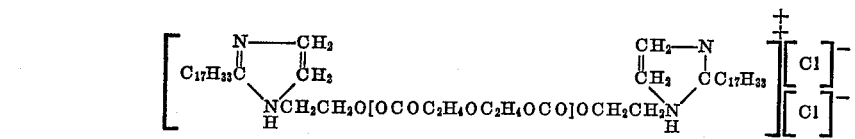

8. The process of claim 1, wherein the compound is

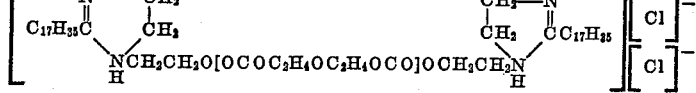

9. The process of claim 1, wherein the compound is

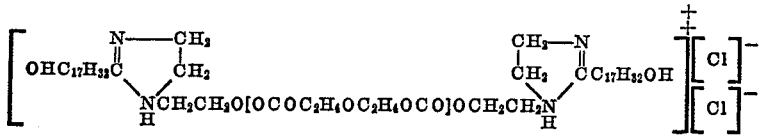

MELVIN DE GROOTE.
BERNHARD KEISER.

REFERENCES CITED

The following references are of record in the file of this patent:

UNITED STATES PATENTS

| Number | Name | Date |
|---|---|---|
| 2,262,357 | De Groote et al. | Nov. 11, 1941 |
| 2,262,743 | De Groote et al. | Nov. 11, 1941 |
| 2,292,208 | De Groote et al. | Aug. 4, 1942 |
| 2,390,078 | De Groote et al. | Dec. 4, 1945 |
| 2,400,394 | De Groote et al. | May 14, 1946 |
| 2,449,241 | Miescher et al. | Sept. 14, 1948 |